United States Patent [19]
Woodman

[11] 3,921,901
[45] Nov. 25, 1975

[54] ATOMIZATION OF LIQUID FUELS
[75] Inventor: David Edward Woodman, Wayland, Mass.
[73] Assignee: Resource Planning Associates, Inc., Cambridge, Mass.
[22] Filed: May 28, 1974
[21] Appl. No.: 473,826

[52] U.S. Cl. .................... 239/13; 239/61; 239/137
[51] Int. Cl.² ........................................ B05B 17/06
[58] Field of Search .......... 239/7, 10, 13, 126, 127, 239/135, 137, 61, 8

[56] References Cited
UNITED STATES PATENTS

| | | |
|---|---|---|
| 2,123,767 | 7/1938 | Clayton et al. .................. 239/13 X |
| 2,165,321 | 7/1939 | Wertz ............................ 239/137 X |
| 2,754,228 | 7/1956 | Bede .............................. 239/13 X |
| 3,640,461 | 2/1972 | Koll ................................ 239/7 |
| 3,770,198 | 11/1973 | Mihara ........................... 239/61 X |

Primary Examiner—John J. Love
Attorney, Agent, or Firm—James C. Wray

[57] ABSTRACT

Fuel oil and water are emulsified under pressure in a ratio of about ninety percent fuel and about ten percent water, forming water droplets in a fuel oil matrix. The emulsion is heated and is released from a nozzle, whereupon the water rapidly expands to steam, shattering the oil into particles of about ten microns or less for promoting gas-like burning of the fuel.

9 Claims, 2 Drawing Figures

ATOMIZATION OF LIQUID FUELS

BACKGROUND OF THE INVENTION

The spraying of liquids is an important process utilized by nearly every industry. Certain processes such as chemical reactions proceed more rapidly as the size of the spray droplets is reduced.

Perhaps the most important use of sprays is preparation of liquid fuels for combustion. In this process the fuel sprays are made by several methods. However, the production of minute fuel droplets in reliable processes is still an area of technology requiring improvement. One essential problem is that some fuel droplets crack or undergo molecular changes if the fuel droplet becomes too hot before vaporation and combustion. Physically, droplets of fuel must evaporate before combustion can occur. Once ignited, the liquid droplets travel through the combustion chamber surrounded by burning fuel vapor.

Improved combustion efficiency and reduced particulate emissions result from the application to existing furnaces of fine atomizing equipment.

In oil burning power plants, particulate emissions, visually identified as light brown to white hazes, are encountered. These particulates have been discussed by many authors and have been shown to be in the 10 micron size range and to consist of up to 99.3 percent combustible material. The type of atomization equipment employed controls the amount and size distribution of the resulting particulates. The percent of fuel appearing in the stack gases as particulates is related to the size distribution of the unburned particles. Since the unburned particle size is a result of the atomization achieved it is clear that low particulate emission rates are associated with the production of a highly atomized fuel spray.

It has been stated that a liquid fuel atomized to a mean droplet size of less than 14 microns burns essentially like a gaseous fuel. In today's technology, the accepted best method of fuel atomization is by means of steam or air operated nozzles in which high velocity steam or air is used to disintegrate fuel jets by viscous interaction of high velocity gas jets and slower moving fuel streams. A method based on sonic atomization which exhibited promise several years ago has been found to be limited in success due to coking in the resonator cavity.

SUMMARY OF THE INVENTION

The present method of fuel atomization utilizes three distinct steps to achieve atomization. The fuel is mixed with water to form an emulsion. The emulsion is heated under pressure to a point below the saturation temperature at the emulsion pressure. The emulsion then exits a nozzle into the combustion chamber. As the emulsion leaves the nozzle, the pressure drops with attendant flashing of the water in the emulsion. As the water flashes to steam, volume increases approximately 1600 times, and the fuel virtually is shattered into a very fine spray.

Energy required to create a spray of droplets is the product of the fluid interfacial tension and the change in surface area associated with creating the spray. In all cases, droplet producing equipment consumes many times this ideal energy. A reason for this inefficient utilization of energy is that little of the input energy is actually transferred to the medium being sprayed. Viscous effects and aerodynamic shocks serve to consume most of the input energy. In the present system, the input energy is in the form of heat. This heat is utilized to flash the water droplets. The energy expended as the water droplets explode easily is transferred to the fuel oil matrix, because the water cannot explodc without rupturing the adjacent oil into droplets. Droplets of fuel are created by viscous forces which occur throughout the oil, in contrast to conventional techniques where viscous forces are concentrated at the edge of the emerging jet.

The flashing of super-heated liquid jets has been studied by numerous investigators. A critical Weber number exists for flashing jets. Rate of bubble growth influences resulting droplet size distribution. In flashing water jets, a nucleus of vapor above the critical size for growth occurs due to hydrodynamic noise in the flow. The bubble then grows explosively, taking heat away from the bulk water surrounding the bubble. When the transfer of heat to the bubble is insufficient to vaporize more water, the bubble stops growing (if it has not already burst) and is no longer effective in flashing the jet.

In an example of the present invention, water droplets are included in a fuel matrix. Each water droplet in the emulsion serves as a source of nucleation. Once the nucleation site achieves the critical diameter, its growth occurs by heat flowing from the surrounding fuel and unvaporized water. The water explosively evaporates inside the fuel matrix, causing the fuel to be atomized. Since the rate of growth of a bubble as it expands initially is great, it is possible to achieve exceedingly fine atomization by varying the size and therefore number of water droplets in the oil matrix. Other variables affecting the quality of the spray include the ratio of water to oil, the degree of superheat of the emulsion and the design of the expansion nozzle.

In the process described here, the fuel is atomized to exceedingly fine droplets so that vaporization is nearly instantaneous. As a consequence of the small droplets and rapid vaporization, combustion is more complete and the production of soot minimized. Another aspect of this process is an inherent lower flame temperature which results in the formation of less nitrogen oxide. These materials, if produced, extract energy from combustion system and are, of course, additionally undesirable because of their environmental impact.

The present invention produces a spray of liquid, for example, fuel oil by first forming an emulsion of the liquid to be sprayed with another liquid referred to as the atomization liquid. The emulsion consists of a matrix of the liquid to be sprayed surrounding droplets of the atomization liquid.

Emulsifying agents may be used, but for heavy fuel oils it has been found that emulsifying agents are not necessary when water is employed as the atomization liquid.

The emulsion is heated under pressure to a temperature sufficient to vaporize essentially all of the water when the emulsion is exhausted to the pressure in the discharge space. Upon discharge to the reduced pressure, the water begins to vaporize and cools it to a boiling point so that heat flows from the oil to the water to continue the vaporization. If the rate of vapor generation is sufficient, the water explodes to steam, shattering the oil matrix into minute droplets.

In any atomization process, energy is required to increase the surface area of the liquid to be sprayed. It has been found that present processes consume much more energy than is theoretically required to cause the increase in surface area associated with atomization. Most of this energy is lost due to viscous effects. In this invention, the input energy is applied during emulsification and during heating of the emulsion to its final temperature. A uniqueness of this method is the process of atomization by the sudden expansion of the atomization liquid when the pressure is reduced through the discharge nozzle. The spray produced consists essentially of minute droplets of the material to be sprayed surrounded by vapor of the atomization liquid.

One object of the invention is the provision of a method for producing fine sprays comprising mixing first and second fluids under pressure and heating the fluids at an elevated pressure to above an atmospheric vaporizing temperature of one of the fluids and releasing the fluids to pressure at which the fluid vaporizes, thereby rapidly expanding the one fluid and forming minute particles of the second fluid.

Another object of the invention is the provision of a method for forming small liquid fuel particles for combustion comprising mixing liquid fuel and a second fluid, heating the mixture at a temperature and pressure at which the second fluid is a liquid, and releasing the mixture at a pressure at which the second fluid is a vapor, thereby forming fine fuel particles.

Another object of the invention is the provision of an oil atomizing system using an oil pump, a pressure regulator and flow controller connected to an oil pump output line, a water pump and a water valve connected to a water pump output line and connected to the flow controller, an emulsifying pump connected to oil and water output lines, a heater connected to the emulsifier, and a nozzle connected to the heater for releasing fuel and water and flashing the water and thereby shattering the oil into particles of about ten microns and less.

The invention has as another object the provision of a method for producing fine particles in sprays comprising the steps of mixing first and second fluids, heating the fluids under pressure to above a temperature at which one of the fluids vaporizes upon being released to a lower pressure and releasing the fluids to the lower pressure, thereby vaporizing the one fluid and forming minute particles of the other fluid.

Another object of the invention is the provision of a method of emulsifying fluids before a heating step by pumping the fluids in a gear pump and by recirculating the fluids around the gear pump.

The invention has as another object the provision of a method atomizing oil with water comprising the steps of separately pumping oil and water, controlling the pressure of the oil, sensing the flow of oil, controlling flow of water in a predetermined ratio to the flow of oil, combining the flows and emulsifying the oil and water, and flashing the water to produce fine oil particles.

Another object of the invention is the provision of improvements in oil spraying methods comprising steps of emulsifying and forming water droplets in an oil matrix in a ratio of about ten percent water and about ninety percent oil.

Another object of this invention is the provision of apparatus for producing fine fluid particles comprising pump means for pressurizing first and second fluids, mixing means connected to the pump means for mixing the fluids, heating means connected to the mixing means for heating the mixed fluids to above a temperature at which one of the fluids vaporizes upon being released to a lower pressure, and release means for releasing the fluids to the lower pressure, thereby vaporizing the one fluid and forming minute particles of the other fluid.

The invention has as a further object the provision of fluid atomizing apparatus comprising first and second fluid pumps, first and second output lines connected respectively to the pumps, a pressure control connected to the first output line, a flow controller connected to the first output line, a valve connected to the second output line and connected to the flow controller for varying flow in the second output line in accordance with a predetermined ratio of flow in the first output line, an emulsifier connected to the first and second output lines for forming an emulsion of the first and second fluids, a heater connected to the emulsifier for heating the emulsion, a heat controller connected to the heater for controlling the heater temperature at a level above which one of the fluids vaporizes at atmospheric pressure, and wherein the release means comprises a nozzle connected to the heater for releasing the emulsion to atmospheric pressure.

These and other objects and features of the invention are apparent in the disclosure, which includes the foregoing and ongoing specification, the claims and the drawings.

DETAILED DESCRIPTION OF THE DRAWING

Figure 1:
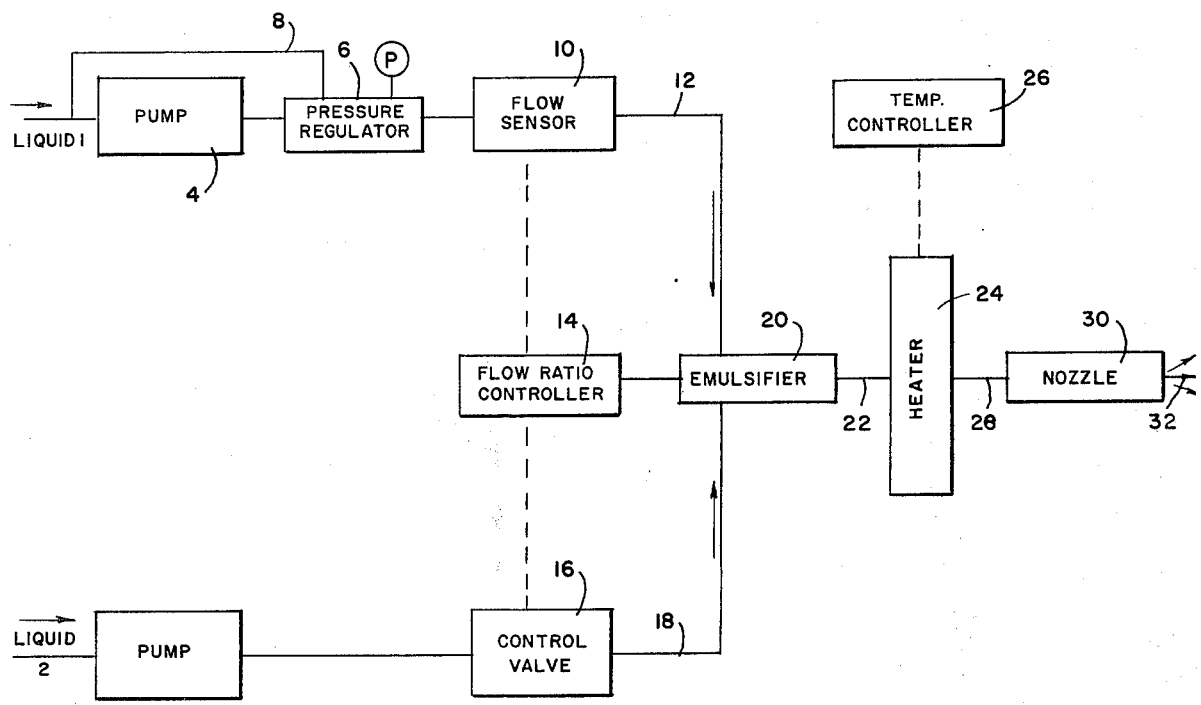
FIG. 1 is a schematic representation of a system for producing small fluid particles.

In FIG. 1, a block diagram of the process steps employed to achieve fuel atomization by this method is shown. Oil is referred to as liquid 1 and water as liquid 2. The oil is pressurized in a pump 4 to a level established by the pressure regulator 6. Excess pressure is relieved through a line 8 connected to the oil pump inlet. The pressure regulator 6 is adjusted to prevent boiling of water at any point in the system. A flow sensor 10 in the oil line 12 detects oil flow rate and by means of a ratio controller 14 and flow control valve 16 adjusts the water flow in water line 18 to the desired ratio of the two liquids. The two liquids meet at the emulsifier 20, where the water is broken down into small droplets surrounded by the oil matrix. The emulsified liquids proceed through to a heater 24 via emulsion line 22 where the emulsion temperature is raised to the desired value by temperature controller 26. The temperature required is based on thermodynamic considerations of the heat required to vaporize the water when the emulsion is exhausted to the discharge pressure. The heated emulsion flows through discharge line 28 to nozzle 30.

In the nozzle 30 the pressure drops as the emulsion progresses toward the discharge end. At a point in the nozzle, the pressure drops below the saturation pressure for the emulsion temperature, and the water begins to vaporize. As the water vaporizes, its volume increases by approximately 1600 times, and the matrix of oil is shattered, causing a fine mist gas-like spray 32.

Figure 2:
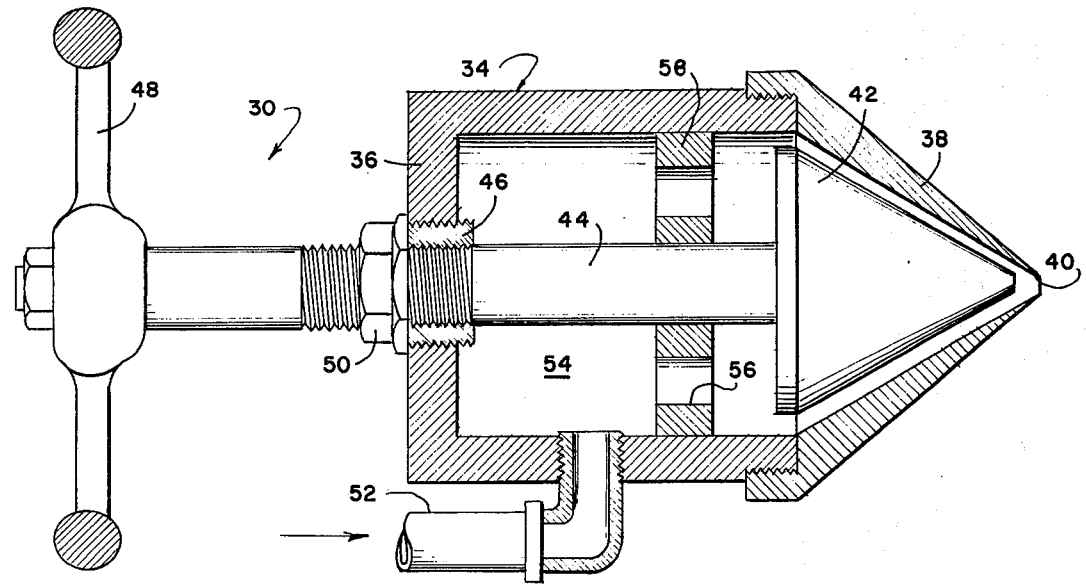
FIG. 2 is a detail of a nozzle for use in the system of FIG. 1.

A valve for flow control either manually or automatically operated is shown in FIG. 2. This valve is located in the nozzle and serves to modulate the emulsion discharge rate without affecting temperatures and pressures elsewhere in the emulsion system.

A key to successful shattering of the liquid is the rate of vapor generation and the quantity of vapor produced. These factors are controlled by the oil to water ratio, the size of water droplets in the emulsion, the degree to which the water is superheated and the nozzle geometry. By adjusting these factors, it is possible to produce sprays having a wide range of sizes, and to optimize these factors for a particular end result.

Referring to FIG. 2, nozzle 30 has a cylindrical body 34 closed at one end 36. An outward tapering cone 38 with a central opening 40 is connected to the open end of body 34. A mating adjustable cone 42 is mounted spaced within cone 38 and supported on a shaft 44. Shaft 44 is threaded 46 is a light sealing relationship through base 36. A handle 40 is provided at an end of the shaft, and a lock nut 50 secures the shaft in position. Emulsion enters plenum 54 through pipe 52 and passes through openings 56 in distributor 58. The distributor encourages uniform flow distribution between cones 42 and 38 and supports shaft 44 along the center of nozzle body 34.

In an example of the invention an emulsion was formed by circulating water and a number six fuel oil from a sump through a gear pump, pumping into a tee which returns most of the water to the sump through a quarter inch tube and which returns a lesser part of the water to the sump through a one-sixteenth inch tube. It is believed that shear in the gear pump and in the tubing, especially in the latter tube, created a fine emulsion. Upon examination under four hundred power magnification of the about ninety percent oil, ten percent water emulsion in the sump, there was found to exist a uniform emulsion consisting of water droplets about two to three microns in diameter within an oil matrix.

In a further example of the invention, an emulsion of about the same characteristics, prepared in about the same way, was formed within a closed, sealed system under pressure of about eighty pounds per square inch. The emulsion was passed through an insulated stainless steel tube through which electric current was passed to heat the emulsion. Preferably, the tube length, emulsion velocity and heating current were controlled so that steam was not formed within the heating tube.

The emulsion was released to atmospheric pressure through a nozzle comprising three quarter inch long number twenty-seven needle. It has been observed that upon increasing heat, the jet issued from the nozzle first turns from dark to reddish, then to white and finally shows flashing. First the flashing shows up in droplets peripherally cast from the jet. Further temperature increase reduces size of a solid core in the jet and finally eliminates the solid core. The whole jet becomes a stream of droplets appearing as a fast moving fog. An impinger was used to collect the fog to avoid laboratory hazard. Numerous observations of a gas smell were made.

Fog particles were examined and were found to be oil droplets of a size of ten microns and less.

Other examples employed number six fuel oil having varied viscosity values in specific saybolt furols of twenty-one and thirty-five. Ratios of five, ten and twenty percent water were employed. Pressures of from about 80 psi to about 140 psi were applied to an emulsion storage sump from a nitrogen system. Temperatures ranging from about 360°F to about 410°F were measured with thermistors near the nozzles. Heat was applied in a twenty feet coil of 0.065 inch stainless steel tubing having a wall thickness of about 0.005 inch. 120 VAC power was supplied to the heater coil, which was coupled in series with parallel-connected 100 and 750 watt resistors. A thermistor near the nozzle and a controller connected to the variable power supply controlled the desired temperatures. Satisfactory results were observed.

Control examples made at pressures too low produce flashing at the nozzle. Issue from the nozzle was observed as bursts of steam interspersed with slugs of oil until the nozzle clogged.

While the invention has been described in part with reference to specific embodiments, modifications and variations within the scope of the invention are obvious to those skilled in the art. The scope of the invention is defined in the following claims which set forth in detail the new features which are considered to be the invention.

I claim:

1. The liquid fuel atomizing method for producing fine fuel particles in furnace buner sprays comprising the steps of mixing a relatively small quantity of first liquid and a relatively large quantity of second liquid fuel, forming a plurality of first liquid droplets in a second liquid matrix, heating the liquids under pressure to a range of temperatures above a temperature at which the first liquid boils and vaporizes upon being rapidly released to the lower pressure, flowing heat from the second liquid fuel to the first liquid to continue vaporization while releasing the fluids to a lower pressure, thereby flashing the first fluid and thereby shattering and forming minute particles of the second fluid.

2. The method of claim 1 further comprising the step of emulsifying the liquids before the heating step.

3. The method of claim 2 wherein the emulsifying step comprises pumping the liquids in a gear pump.

4. The method of claim 3 wherein the emulsifying step further comprises recirculating the liquids around the gear pump.

5. The method of claim 1 wherein the first liquid is water and the second liquid is fuel oil and further comprising the initial steps of separately pumping fuel oil and water, controlling the pressure of the fuel oil, sensing the flow of oil, controlling flow of water in a predetermined ratio to the flow of fuel oil, combining the flows, and emulsifying the fuel oil and water.

6. The method of claim 5 in which the emulsifying comprises forming water droplets in an oil matrix.

7. The method of claim 6 in which the controlling flow comprises controlling flow in a ratio of about ten percent water and about ninety percent oil.

8. Apparatus for use in the method of claim 1 comprising separate first relatively small and second relatively large respectively pressurizing means for mixing the liquids, heating means connected to the mixing means for heating the mixed fluids to above a temperature at which the first liquid flashes upon being released to a lower pressure, and release means for releasing the liquids to the lower pressure, while transferring heat from the second liquid fuel to the first liquid for continuing vaporization of the first liquid, thereby flashing the first liquid and thereby shattering and forming minute particles of the second liquid.

9. The apparatus of claim 8 comprising first and second pressurizing means, first and second output lines connected respectively to the pressurizing means, a pressure control connected to the first output line, valve connected to the second output line and connected to the flow controller for varying flow in the second output line in accordance with a predetermined ratio of flow in the first output line, and emulsifier connected to the first and second output lines for forming an emulsion of the first and second liquids, a heater connected to the emulsifier for heating the emulsion, a heat controller connected to the heater for controlling the heater temperature at a level above which one of the liquids vaporizes at atmospheric pressure, and wherein the release means comprises a nozzle connected to the heater for releasing the emulsion to atmospheric pressure.

* * * * *